Feb. 4, 1958 G. S. EPSTEIN 2,822,510

SERIES RESONANT FREQUENCY DISCRIMINATOR CIRCUIT

Filed March 3, 1953

*INVENTOR.*
GERALD S. EPSTEIN
*BY*
Harry M. Saragovitz
Attorney 2,822,510

SERIES RESONANT FREQUENCY DISCRIMINATOR CIRCUIT

Gerald S. Epstein, New York, N. Y., assignor to the United States of America as represented by the Secretary of the Army Application March 3, 1953, Serial No. 340,170

4 Claims. (Cl. 317—147)

(Granted under Title 35, U. S. Code (1952), sec. 266)

The invention described herein may be manufactured and used by or for the Government for governmental purposes, without the payment of any royalty thereon.

The subject invention relates to discriminator circuits and more particularly to a discriminator circuit for use with low impedance matching devices.

The standard detecting and discriminating circuits usually comprise parallel tuned circuits presenting a high impedance at resonant frequency across a load device. Series tuned circuits on the other hand present a low impedance at resonance.

The classical series tuned circuit, which is very well known in the art, has some use in certain antenna systems, phase shifters and I. F. bandpass filters but it is not extensively used. In its conventional usage in an antenna input the signal is taken across an inductance with the antenna considered as the series capacity. In I. F. filters, two standard parallel resonant circuits may be coupled by a series resonant circuit to increase the coupling sharply during resonance and decrease the coupling between the I. F. stages for frequency out of resonance, which provides a triple resonance effect. In both cases the output is taken across the condenser or the inductance or both in series and is in the form of alternating current. In this invention, the output is detected at low impedance with the load taken across the detector or rectifier.

It is therefore an object of this invention to provide a low impedance detecting means.

It is a further object of this invention to provide a detecting means for a transistor output.

It is a further object of this invention to provide a detecting means having a low impedance input and low impedance output.

It is a further object of this invention to provide a discriminator having dual tuned circuits with low impedance input and low impedance output.

Figure 1:
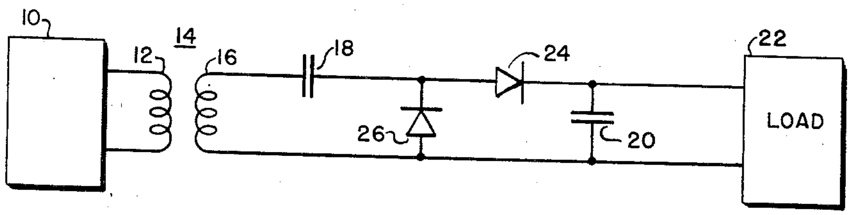
Figure 2:
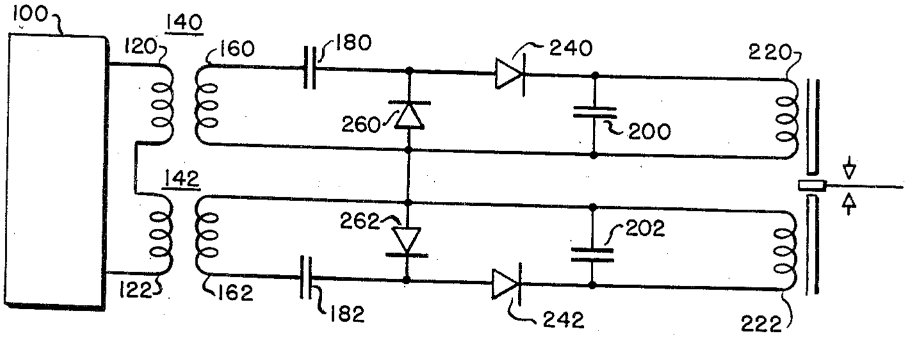

Other and further objects of this invention will become apparent from the following specifications and the drawings in which Fig. 1 shows a low impedance detector and Fig. 2 shows a low impedance discriminator.

Considering Fig. 1, a signal source 10 is coupled to the primary 12 of a transformer 14 whose secondary 16 is part of the series tuned circuit including condenser 18, condenser 20, load 22 and rectifiers 24 and 26. In this circuit resonant frequency is primarily determined by the inductance 16 and capacitance 18, a low impedance path being provided to complete the series circuit through rectifier 26 or rectifier 24 and load 22 or condenser 20. The low impedance series path is completed for A. C. in one direction through the rectifier 26 and in the opposite direction through the rectifier 24 and condenser 20 or load 22. The D. C. is built up across the condenser to supply the detected voltage to the load. The condenser 20 also serves to prevent reverse effects from the load 22 which may be an inductance and the rectifier 26 prevents backward excursions on the rectifier 24 from becoming too large. When the frequency of the source 10 matches the resonant frequency of the series tuned circuit a maximum current will flow at low impedance to drive the load 22.

Considering now Fig. 2, a driving source 100 is coupled through coils 120 and 122 which are primaries of the transformers 140 and 142 respectively. The secondaries 160 and 162 of transformers 140 and 142 form parts of series resonant circuits including condensers 180 and 182, and rectifiers 260 and 262, or rectifiers 240 and 242 and condensers 200 and 202 or coils 220 and 222 respectively. The separate halves of the discriminator function in somewhat the same manner as the series detector circuit described in Fig. 1. The two series circuits of the discriminator are tuned to separate adjacent frequency bands to detect the frequency shift.

A standard discriminator circuit composed of parallel type resonant circuits will present a very high impedance to the frequency shift transistor input thus not permitting the correct load for bi-stable operation. In other words, the parallel tuned discriminator which normally works into a vacuum tube presents practically an infinite input impedance at resonant frequency. Since the transistor impedance is relatively low the standard parallel tuned discriminator will permit practically no voltage whatsoever to be developed across the output terminals. In the series tuned discriminator circuit, the impedance at resonant frequency is quite low and the discriminator becomes essentially a power device.

Considering the series tuned discriminator of Fig. 2 for frequency shift teletype service, in mark condition the current through relay winding 220 is approximately 7 milliamperes and the current through relay winding 222 is approximately 4 milliamperes. For space condition the current through 220 is approximately 4 milliamperes and current through 222 is approximately 7 milliamperes. This current differential is sufficient with the series discriminator used here to drive the relay directly with an input difference frequency of 425 cycles per second at a center discriminator frequency of 29.3 kilocycles. The current differential can even be made great enough to operate the relay 220—222 down to plus or minus 250 cycles per second. The characteristics of the discriminator will vary in practice with the amounts of inductance, the characteristics of the diodes and the other circuit components. The push-pull discriminator of Fig. 2 provides a higher output and greater power to operate a relay load more effectively than the single sided detector of Fig. 1.

What is claimed is:

1. A series-resonant detector comprising a coil connected in series with a first condenser and a first low impedance rectifier to form a circuit which is series-resonant at a predetermined frequency, a second condenser in series with a second low impedance rectifier connected across said first rectifier, and a load connected across said second condenser.

2. A series-resonant detector for low-impedance loads, comprising a coil connected in series with a first condenser and a first rectifier to form a circuit which is series-resonant at a predetermined frequency, a second rectifier, the positive terminal of one of said rectifiers connected to the negative terminal of the other of said rectifiers, a second condenser connected across the other terminals of said rectifiers, and means to connect a load across said second condenser.

3. A frequency discriminator comprising a first series tuned circuit tuned to a first frequency and including a first coil, first condenser and a first low impedance rectifier connected in series, a second low impedance rectifier connected in series with a second condenser solely across said first rectifier, a second series resonant circuit tuned to an adjacent frequency and including a second coil, a third condenser and a third low impedance rectifier connected in series, a fourth low impedance rectifier connected in series with a fourth condenser solely across said third rectifier, and an output circuit connected solely across said second and fourth condensers.

4. In connection with a source of frequency modulated RF energy, a coil coupled to said source of RF energy, a first series-resonant circuit including a coil inductively coupled to said coil, said coil being connected to a first condenser and a low impedance rectifier in series, a second series- resonant circuit including a second coil connected to a second low impedance rectifier and condenser in series, a third rectifier and condenser connected in series solely with said first rectifier, a fourth rectifier and condenser connected in series solely with said second rectifier, a first relay coil connected solely across said third condenser and a second relay coil connected solely across said fourth condenser, a first polarity of said first rectifier connected to the same polarity of said second rectifier, and the same polarity of said third and fourth rectifiers connected to the opposite polarity of said first and second rectifiers respectively, said first and second series-resonant circuit being respectively tuned to slightly spaced frequencies.

References Cited in the file of this patent

UNITED STATES PATENTS

| | | |
|---|---|---|
| 1,214,022 | Edelman | Jan. 30, 1917 |
| 1,712,051 | Round | May 7, 1929 |
| 1,758,540 | Shaw | May 13, 1930 |
| 2,422,513 | Yeandle | June 17, 1947 |
| 2,454,687 | Baughman | Nov. 23, 1948 |
| 2,491,921 | Hepp | Dec. 20, 1949 |
| 2,560,378 | White | July 10. 1951 |
| 2,569,000 | Hadfield | Sept. 25, 1951 |
| 2,581,968 | Norton | Jan. 8, 1952 |
| 2,636,980 | Reynolds | Apr. 28, 1953 |
| 2,640,939 | Staschover | June 2, 1953 |
| 2,641,693 | Labin | June 9, 1953 |